United States Patent

Miura et al.

[11] Patent Number: 5,695,728
[45] Date of Patent: Dec. 9, 1997

[54] METHOD FOR REMOVAL OF NITROGEN OXIDES

[75] Inventors: Hiroshi Miura; Senshi Kasahara, both of Shinnanyo; Hidekazu Aoyama, Tokuyama; Kazuhiko Sekizawa, Shinnanyo, all of Japan

[73] Assignee: Tosoh Corporation, Shinnanyo, Japan

[21] Appl. No.: 661,151

[22] Filed: Jun. 10, 1996

Related U.S. Application Data

[63] Continuation of Ser. No. 263,716, Jun. 22, 1994, abandoned.

[30] Foreign Application Priority Data

Jun. 25, 1993 [JP] Japan .................................. 5-155119
Aug. 23, 1993 [JP] Japan .................................. 5-207478

[51] Int. Cl.$^6$ .................................................. B01J 8/00
[52] U.S. Cl. .................................................. 423/239.2
[58] Field of Search .................................... 423/239.2

[56] References Cited

U.S. PATENT DOCUMENTS 5,143,707  9/1992  Beck et al. ........................ 423/239
5,254,322  10/1993  Bhore et al. ...................... 423/239.2
5,310,548  5/1994  Tsuru et al. ....................... 424/76.3

FOREIGN PATENT DOCUMENTS 0 300 670   1/1989   European Pat. Off. .
0 396 085  11/1990   European Pat. Off. .
60-125250   7/1985   Japan .
63-100919   5/1988   Japan .
6-55075     3/1994   Japan .

*Primary Examiner*—Michael Lewis
*Assistant Examiner*—Thomas G. Dunn, Jr.
*Attorney, Agent, or Firm*—Oblon, Spivak, McClelland, Maier & Neustadt, P.C.

[57] ABSTRACT

A method for removing nitrogen oxides from an oxygen-rich exhaust gas containing nitrogen oxides and hydrocarbons comprising bringing the oxygen-rich exhaust gas into contact with a catalyst comprising (1)(i) a zeolite containing an apatite compound and having an $SiO_2/Al_2O_3$ molar ratio of at least 15 and (ii) at least one active metal or (2)(ii) a zeolite containing an apatite compound and having an $SiO_2/Al_2O_3$ molar ratio of at least 15, (ii) an alkaline earth metal and (iii) at least one active metal.

15 Claims, No Drawings

METHOD FOR REMOVAL OF NITROGEN OXIDES

This application is a continuation of application Ser. No. 08/263,716, filed on Jun. 22, 1994, now abandoned.

BACKGROUND OF THE INVENTION

1. Field of the Invention

The present invention relates to a method for catalytically treating an oxygen-rich exhaust gas containing nitrogen oxides discharged from, for example, boilers, automobile engines. More specifically, it relates to a method for removing nitrogen oxides from the oxygen-rich exhaust gas in the presence of a catalyst having a superior activity and durability. The term "oxygen rich exhaust gas" used herein means an exhaust gas containing oxygen in an amount exceeding the amount of oxygen necessary for completely oxidizing carbon monoxide, hydrocarbons and hydrogen contained in the exhaust gas.

2. Description of the Related Art

As methods for removing nitrogen oxides from exhaust gas containing the same, discharged from for example, boilers, automobile engines, methods of selective catalytic reduction with ammonia in the presence of a catalyst and methods of non-selective catalytic reduction by allowing the exhaust gas to be passed through a catalyst whereby nitrogen oxides are reduced by unburnt carbon monoxide and hydrocarbons have been commercialized.

Japanese Unexamined Patent Publication (Kokai) No. 60-125250 proposes copper-ion exchanged zeolite, as a catalyst capable of directly decomposing the nitrogen oxides without using a reducing agent.

Further, there has been proposed as a catalyst for purifying the exhaust gas discharged from a diesel engine or a lean burn engine designed for low fuel consumption and capable of selectively reducing nitrogen oxides with the reductants such as unburnt carbon monoxide, hydrocarbons, even in an oxygen-rich state, a catalyst comprising zeolite containing a base metal (e.g., Japanese Unexamined Patent Publication (Kokai) No. 63-100919).

However, the above-proposed catalysts have problems with durability, particularly at a high temperature, and therefore, those catalysts have not been commercialized.

SUMMARY OF THE INVENTION

Accordingly, the object of the present invention is to provide a method for purifying an exhaust gas, without using reducing agents such as ammonia, in the presence of an exhaust gas purifying catalyst capable of efficiently purifying, especially oxygen-rich exhaust gas discharged from an internal combustion engine of, for example, an automobile and having a superior durability at high temperature in the presence of steam.

Other objects and advantages of the present invention will be apparent from the following description.

In accordance with the present invention, there is provided a method for removing nitrogen oxides from an oxygen-rich exhaust gas containing nitrogen oxides and hydrocarbons comprising bringing the oxygen-rich exhaust gas into contact with a catalyst comprising (i) a zeolite containing an apatite compound and having an $SiO_2/Al_2O_3$ molar ratio of at least 15 and (ii) at least one active metal.

In accordance with the present invention, there is also provided a method for removing nitrogen oxides from an oxygen-rich exhaust gas containing nitrogen oxides and hydrocarbons comprising bringing the oxygen-rich exhaust gas into contact with a catalyst comprising (i) a zeolite containing an apatite compound and having an $SiO_2/Al_2O_3$ molar ratio of at least 15, (ii) an alkaline earth metal and (iii) at least one active metal.

DESCRIPTION OF THE PREFERRED EMBODIMENTS

The present inventors engaged in intensive studies on the above-mentioned problems and found that by using a catalyst composed of a zeolite containing an apatite compound and at least one active metal or a catalyst composed of a zeolite containing an apatite compound, an alkaline earth metal and at least one active metal, the exhaust gas can be efficiently purified even after use at a high temperature, and thus, the present invention has been completed.

The present invention will now be explained in more detail.

The catalyst usable in the present invention comprises (1)(i) a zeolite containing an apatite compound and having an $SiO_2/Al_2O_3$ molar ratio of at least 15 and (ii) at least one active metal or (2)(i) a zeolite containing an apatite compound and having an $SiO_2/Al_2O_3$ molar ratio of at least 15, (ii) an alkaline earth metal and (iii) at least one active metal.

The molar ratio of the $SiO_2/Al_2O_3$ of the zeolite used in the present invention must be at least 15. Although there are no upper limits in the molar ratio of the $SiO_2/Al_2O_3$, the molar ratio of the $SiO_2/Al_2O_3$ of less than 15 does not provide sufficient durability. The preferable molar ratio is 15 to 200.

Although, the type of the zeolite is not particularly limited, use may be made of, for example, mordenite, ferrierite, zeolite-β, ZSM-5, ZSM-8, ZSM-11, ZSM-12, ZSM-20, ZSM-35, and other zeolites. Among these, ZSM-5 is desirably used. Further, the method used for the production of these zeolites is not particularly limited. Also, dealuminated zeolites such as zeolite Y, zeolite L, may be used.

The starting zeolite may be synthesized products or calcined products, and use may also be made of an $H^+$ ion-exchanged or ammonium ion-exchanged zeolite obtained by treating the ions such as sodium in the starting zeolite with, for example, ammonium salt or mineral acids. Further, use may be made of those obtained through ion-exchange with, for example, potassium, cesium.

As the apatite compound usable in the present invention, mention may be made of a stoichiometric apatite compound and non-stoichiometric apatite compound having the crystalline structure inherent to apatite and having the general formula:

$$M_x(ZO_4)_6A_2$$

wherein, M is a mono- to tri-valent positive ion such as, for example, Ca, Pb, Cd, Sr, Ni, Eu, Al, Y, La, Ce, Na, K, Z is a tri- to septa-valent positive ion such as, for example, P, As, V, Cr, Si, C, Al, S, and Re, A is a zero-valent to tri-valent negative ion such as, for example, OH, F, Cl, Br, I, O, N, $CO_3$, $H_2O$, and $x \leq 10$. A stoichiometric apatite compound means a compound having a composition of $x=10$, while a non-stoichiometric apatite compound means a compound prepared by, for example, the precipitation process and having an apatite structure, but having a composition of $x<10$.

Further, as the M in the apatite compound in the present invention, two or more kinds of ions may be included. In this case, in addition to the above-mentioned ions, magnesium, manganese, and zinc may be also included.

The method of introduction of an apatite compound into the zeolite is not particularly limited, but it is possible to introduce it by the precipitation method of mixing an aqueous solution containing M wherein M is the same as defined above and an aqueous solution containing $ZO_4$ wherein Z is the same as defined above in the presence of a zeolite and causing precipitation of the apatite compound, the physical mixing method of physically mixing an apatite compound with a zeolite in the solid phase or liquid phase, etc. Further, the apatite compound can be introduced by introducing an apatite precursor such as $\alpha\text{-}Ca_3(PO_4)_2$, $\beta\text{-}Ca_3(PO_4)_2$, amorphous calcium phosphate $(Ca_3(PO_4)_2)$, $CaHPO_4 \cdot 2H_2O$, $CaHPO_4$, or the like, into a zeolite, then causing hydrolysis under basic conditions to convert the same to an apatite compound. The content of the apatite compound is not particularly limited, but preferably is 0.1 to 80% by weight of apatite contained in the zeolite, more preferably 1 to 50% by weight. Further, the catalyst containing the apatite compound may be thermally treated at 100° C. to 900° C., preferably 300° C. to 600° C., so as to stabilize the apatite compound. The atmosphere of the thermally treatment is not particularly limited, but mention may be made of a vacuum, air, steam, or other atmosphere.

The zeolite according to the present invention contains at least one active metal species. As the active metal species, any metals used in the conventional exhaust gas purification. For example, use is made of the metals of the Group Ib such as copper, silver, gold; the metals of the Group VIII such as iron, cobalt, nickel, ruthenium, rhodium, palladium, platinum; the metals of the Group VIb such as chromium, molybdenum, and the metals of the Group VIIb such as manganese. Particularly preferable active metals are copper and cobalt.

The method of introduction of the active metal into the zeolite is not particularly limited. Use may be made of the impregnation method, the evaporation to dryness method, the ion-exchange method, and other conventional techniques. When the active metal is present at the ion exchange able site of the zeolite, the higher activity can be obtained, and therefore, it is preferable to introduce the active metal by the ion-exchange method. The ion-exchange may be performed by mixing zeolite containing apatite compound into an aqueous solution containing an active metal salt, followed by agitating and washing the same.

As the salt of the active metal, use is suitably made of a chloride, nitrate, sulfate, acetate, or other salt of an active metal. Further, an ammine complex salt of the active metal may also be suitably used.

The amount of the active metal added, the temperature, the time, etc. at the time of ion-exchange are not particularly limited, and the conventional method can be used. The amount of the active metal added is preferably 0.5 to 20 times in terms of the number of moles of active metal atoms based upon to the number of moles of Al atoms in the zeolite so as to give sufficient activity and durability. Further, the concentration of solid in the slurry during the ion-exchange is preferably 5 to 50% by weight, as conventionally used. The ion-exchange temperature and time are preferably a temperature of from room temperature to 100° C. and a time of 5 minutes to three days so as to give sufficient activity and durability. Further, optionally or if desired, it is possible to perform the ion-exchange procedure repeatedly.

Further, after at least one active metal is introduced into the zeolite, it is also possible to introduce an apatite compound into the zeolite by the above-mentioned any method and to use the resultant catalyst for purifying an exhaust gas.

According to the present invention, it is possible to further include an alkaline earth metal into the catalyst usable in the present invention. The alkaline earth metal introduced may be calcium, magnesium, strontium, barium. Particularly preferable alkaline earth metals are barium and magnesium.

Although the method of introduction of the alkaline earth metal is not particularly limited, the conventional ion-exchange method can be preferably used. The ion-exchange may be performed by mixing the zeolite or an apatite compound or the zeolite containing an apatite compound in an aqueous solution containing a salt of an alkaline earth metal, followed by agitating and washing.

As the salt of the alkaline earth metal, use is suitably made of a chloride, nitrate, sulfate, acetate, or other salts of an alkaline earth metal. The amount of the alkaline earth metal added, the temperature, the time, etc. at the time of the ion-exchange are not particularly limited, and the conventional method generally used is sufficient. The atomic ratio of the alkaline earth metal added is preferably 0.5 to 20, to the aluminium atoms in the zeolite included in the catalyst so as to give sufficient activity and durability. Further, the slurry concentration of solid in the slurry during the ion-exchange is preferably 5 to 50% by weight as usual. Also, the ion-exchange temperature and time are preferably a temperature of from room temperature to 100° C. and a time of 5 minutes to three days so as to give sufficient activity and durability. Further, optionally or if desired, the ion-exchange procedure can be repeatedly performed.

The procedures for introduction of the alkaline earth metal and the active metal are not particularly limited. For example, mention may be made of:

(1) A method of ion-exchanging the zeolite with an alkaline earth metal, introducing the apatite compound, and then introducing the active metal.

(2) The method of ion-exchanging the zeolite with the alkaline earth metal, introducing the active metal, followed by introducing the apatite compound.

(3) The method of introducing the apatite compound into the zeolite, ion-exchanging with the alkaline earth metal, followed by introducing the active metal.

(4) The method of introducing the apatite compound into the zeolite, introducing the active metal, and then ion-exchanging with the alkaline earth metal.

(5) The method of introducing the active metal into the zeolite, then introducing the apatite compound which was ion-exchanged with the alkaline earth metal.

(6) The method of introducing the active metal into the zeolite, introducing the apatite compound, and then ion-exchanging with the alkaline earth metal.

(7) The method of introducing the active metal into the zeolite, ion-exchanging with the alkaline earth metal, then introducing the apatite compound.

However, finally, it is sufficient if the catalyst include a zeolite, an apatite compound, an alkaline earth metal, and at least one active metal. The procedure for introduction of the apatite compound, the procedure for introduction of the alkaline earth metal, the procedure for introduction of the at least one active metal, etc. may be combined as desired and performed in any order.

In this way, it is possible to prepare the catalyst for purifying the exhaust gas used in the present invention.

The catalyst for purifying exhaust gas usable in the present invention may be used, after mixing and molding with a binder such as a clay mineral. As the method of preparation, for example, mention may be made of the method of molding the zeolite in advance and then introducing, into the molded product, the apatite compound, alkaline earth metal, and active metal or the method of molding zeolite into which an apatite compound has been introduced and then introducing into an alkaline earth metal and active metal into the molded product.

As the binder usable at the time of molding the zeolite, use is made of clay minerals such as kaolin, attapulgite, montmorillonite, bentonite, allophane, sepiolite, and other clay minerals. Alternatively, it is possible to use a binderless zeolite molded article obtained by directly synthesizing the molded article without use of binder. In addition, use may be made of the exhaust gas purification catalyst used in the present invention to give a washcoat to a cordierite or metal honeycomb support.

The catalyst for purifying the exhaust gas thus prepared is brought into contact with the oxygen-rich exhaust gas containing the nitrogen oxides and hydrocarbons so as to remove the nitrogen oxides. The exhaust gas applicable to the present invention must contain nitrogen oxides and hydrocarbons and be oxygen rich, but the invention is also effective in the case where carbon monoxide, hydrogen, etc. are contained. The oxygen-rich exhaust gas means an excess amount of oxygen is contained, compared with the amount of oxygen required for complete oxidation of the carbon monoxide, hydrocarbons, and hydrogen contained in the exhaust gas. For example, in the case of an exhaust gas discharged from an internal combustion engine of an automobile etc., this is the state when the air-fuel ratio is large (lean region).

The space velocity, temperature, etc when the nitrogen oxides are removed are not particularly limited, but it is preferable if the space velocity is 100 to 500,000 $hr^{-1}$ and the temperature is 200° to 800° C.

EXAMPLES

The present invention will now be further illustrated by, but is by no means limited to, the following Examples.

Example 1

To an overflow type reaction vessel having a net volume of 2 liters, while agitating, was continuously fed with an aqueous solution of sodium silicate ($SiO_2$: 250 g/liter, $Na_2O$: 82 g/liter, $Al_2O_3$: 2.8 g/liter) and an aqueous solution of aluminum sulfate ($Al_2O_3$: 8.8 g/liter, $H_2SO_4$: 370 g/liter) at rates of 3 liters/hr and 1 liter/hr, respectively. The reaction temperature was 30° to 32° C. and the pH of the discharged slurry was 6.7 to 7.0.

The discharged slurry was subjected to solid-liquid separation and the resultant cake thoroughly washed with water to obtain a uniform granular, amorphous aluminosilicate amorphous compound comprising 0.75% by weight of $Na_2O$, 0.77% by weight of $Al_2O_3$, 36.1% by weight of $SiO_2$, and 62.5% by weight of $H_2O$. A 2860 g amount of the compound and 6150 g of a 3.2% by weight NaOH aqueous solution were charged into an autoclave and crystallized at 160° C. for 72 hours with stirring. The product was subjected to solid-liquid separation, and the resultant cake was washed with water and dried to obtain the ZSM-5 type zeolite. As a result of chemical analysis, it was found that the composition was as follows expressed by the molar ratio of oxides in an anhydrous base.

$$1.3\ Na_2O,\ Al_2O_3,\ 41\ SiO_2$$

Ten grams of the above-prepared zeolite were added to 100 $cm^3$ of an aqueous solution containing 2 g of $NH_4Cl$. The resultant mixture was stirred at 60° C. for 20 hours, then the solid product was washed and dried to perform the $NH_4$ ion-exchange and an ammonium ion-exchanged zeolite was obtained.

Ten grams of the above-prepared ammonium ion-exchanged zeolite were added to 143 $cm^3$ of a 0.07 mol/liter aqueous solution of calcium acetate, followed by stirring. Then, a solution of 71 $cm^3$ of a 0.09 mol/liter aqueous solution of ammonium dihydrogen phosphate adjusted to a pH of 8.5 by aqueous ammonia was dropwise added to cause the calcium phosphate to coprecipitate. The resultant mixture was stirred at 60° C. for two hours, then the solid product was washed and dried. Thereafter, this was calcined at 500° C. for 5 hours under an air flow to obtain a zeolite containing an apatite compound therein.

Ten grams of the resultant zeolite containing an apatite compound were added to 100 $cm^3$ of a 0.07 mol/liter aqueous solution of copper acetate. The mixture was adjusted to a pH of 10.5 by aqueous ammonia, then stirred at room temperature for 20 hours, then the solid product was washed, to subject to Cu ion-exchange operation. This operation was repeated two times, then the resultant product was dried to prepare the Catalyst 1. As a result of an X ray diffraction measurement of the Catalyst 1, peaks representing an apatite structure other than zeolite were observed. Further, as a result of chemical analysis, it was found that the composition of Catalyst 1, expressed by the molar ratio of oxides in an anhydrous base, was as follows. The content of the apatite was 7.1% by weight.

$$1.09\ CuO,\ 2.16\ CaO,\ 0.71\ P_2O_5,\ Al_2O_3,\ 41\ SiO_2$$

Example 2

The same procedure was performed as in Example 1 to prepare the Catalyst 2, except that, instead of the 0.07 mol/liter aqueous solution of calcium acetate, a 0.41 mol/liter aqueous solution of calcium acetate was used and, instead of the 0.09 mol/liter aqueous solution of ammonium dihydrogen phosphate, a 0.55 mol/liter aqueous solution of ammonium dihydrogen phosphate was used. As a result of an X ray diffraction measurement of the Catalyst 2, peaks representing an apatite structure other than zeolite were observed. Further, as a result of chemical analysis, it was found that the composition of Catalyst 2, expressed by the molar ratio of oxides in an anhydrous base, was as follows. The content of the apatite was 33% by weight.

$$1.88\ CuO,\ 14.0\ CaO,\ 4.89\ P_2O_5,\ Al_2O_3,\ 41\ SiO_2$$

Example 3

A 10 g amount of Na-zeolite immediately after the synthesis thereof, prepared in the same way as in Example 1, was added to 100 $cm^3$ of an aqueous solution containing 2.8 g of KCl. The mixture was stirred at 60° C. for 20 hours, then the solid product was washed. This operation was performed two times, then the resultant product was dried to obtain the potassium ion-exchanged zeolite. As a result of chemical analysis, it was found that the composition, expressed by the molar ratio of oxides in an anhydrous base, was as follows.

$$K_2O,\ Al_2O_3,\ 41\ SiO_2$$

Ten grams of the above-prepared potassium ion-exchanged zeolite were added to 143 $cm^3$ of a 0.21 mol/liter aqueous solution of calcium acetate and the mixture was stirred. Then, an aqueous solution of 71 $cm^3$ of a 0.28 mol/liter aqueous solution of ammonium dihydrogen phosphate adjusted to a pH of 8.5 by aqueous ammonia was dropwise added to cause the calcium phosphate to coprecipitate. The resultant slurry was stirred at 60° C. for two hours, then the solid product was washed and dried. Thereafter, the dried product was calcined at 500° C. for 5 hours under an air flow to obtain a potassium ion-exchanged zeolite containing an apatite compound therein.

Ten grams of a potassium ion-exchanged zeolite containing an apatite compound were added to 100 cm$^3$ of a 0.07 mol/liter aqueous solution of copper acetate. The mixture was stirred at 40° C. for 20 hours, then the solid product was washed, to subject to the Cu ion-exchange operation. This operation was repeated four times, then the resultant product was dried to prepare the Catalyst 3. As a result of an X ray diffraction measurement of the Catalyst 3, peaks representing an apatite structure other than zeolite were observed. Further, as a result of chemical analysis, it was found that the composition of Catalyst 3, expressed by the molar ratio of oxides in an anhydrous base, was as follows. The content of the apatite was 18% by weight.

2.16 CuO, 6.19 CaO, 2.39 $P_2O_5$, 0.03 $K_2O$, $Al_2O_3$, 41 $SiO_2$

Example 4

The same procedure was performed as in Example 1 to prepare the Catalyst 4, except that, instead of the 0.07 mol/liter aqueous solution of calcium acetate, a 0.21 mol/liter aqueous solution of calcium acetate was used, and, instead of the 0.09 mol/liter aqueous solution of ammonium dihydrogen phosphate, a 0.28 mol/liter aqueous solution of ammonium dihydrogen phosphate was used, and, instead of the Cu ion-exchange operation, Co ion-exchange operation was performed. The Co ion-exchange operation was performed as follows:

Namely, 10 g of a zeolite containing an apatite compound were added to 90 cm$^3$ of a 0.22 mol/liter aqueous solution of Co (II) acetate. The mixture was stirred at 60° C. for 20 hours, then the solid product was washed to subject to the Co ion-exchange operation. This operation was repeated two times, then the resultant product was dried to prepare the Catalyst 4. As a result of an X ray diffraction measurement of the Catalyst 4, peaks representing an apatite structure other than zeolite were observed. Further, as a result of chemical analysis, it was found that the composition of Catalyst 4, expressed by the molar ratio of oxides in an anhydrous base, was as follows. The content of the apatite was 25% by weight.

1.40 CoO, 7.18 CaO, 2.40 $P_2O_5$, $Al_2O_3$, 41 $SiO_2$

Example 5

Ten grams of an ammonium ion-exchanged zeolite prepared in the same manner as in Example 1 was stirred and mixed in 100 cm$^3$ of an aqueous solution, together with 2.55 g of commercially available hydroxyapatite (made by Kishida Kagaku), then the solid product was washed and dried. Thereafter, the resultant product was calcined at 500° C. for 5 hours under an air flow to obtain a zeolite containing an apatite compound therein.

A 10 g amount of the above-prepared zeolite containing an apatite compound was added to 100 cm$^3$ of a 0.07 mol/liter aqueous solution of copper acetate. This was adjusted to a pH of 10.5 by aqueous ammonia, then the solid product was washed to subject to the Cu ion-exchange operation. This procedure was repeated two times, then the resultant product was dried to prepare the Catalyst 5. As a result of an X ray diffraction measurement of the Catalyst 5, peaks representing an apatite structure other than zeolite were obserbed. Further, as a result of chemical analysis, it was found that the composition of Catalyst 5, expressed by the molar ratio of oxides in an anhydrous base, was as follows. The apatite content was 18% by weight.

1.40 CuO, 6.03 CaO, 2.00 $P_2O_5$, $Al_2O_3$, 41 $SiO_2$

Example 6

Ten grams of ammonium ion-exchanged zeolite prepared in the same manner as in Example 1 were added to 41 cm$^3$ of a 0.1 mol/liter aqueous solution of copper acetate. The mixture was adjusted to a pH of 10.5 by aqueous ammonia, then was stirred at room temperature for 20 hours. Thereafter, the solid product was washed, to subject to the Cu ion-exchange operation. This operation was repeated two times, then the resultant product was dried to prepare the Cu ion-exchanged zeolite.

Ten grams of the Cu ion-exchanged type zeolite prepared above was stirred and mixed in 100 cm$^3$ of an aqueous solution, together with 2.55 g of commercially available hydroxyapatite (made by Kishida Kagaku), then the solid product was washed and dried. Thereafter, the product was calcined at 500° C. for 5 hours under an air flow to prepare the Catalyst 6. As a result of an X ray diffraction measurement of the Catalyst 6, peaks representing an apatite structure other than zeolite, were observed. Further, as a result of chemical analysis, it was found that the composition of Catalyst 6, expressed by the molar ratio of oxides in an anhydrous base, was as follows. The apatite content was 20% by weight.

1.05 CuO, 7.17 CaO, 2.15 $P_2O_5$, $Al_2O_3$, 41 $SiO_2$

Example 7

Ten grams of ammonium ion-exchanged zeolite prepared in the same manner as in Example 1 were added to 286 cm$^3$ of a 0.20 mol/liter aqueous solution of ammonium nitrate, followed by stirring. The mixture was adjusted to a pH of 9.0 by aqueous ammonia. Then, 143 cm$^3$ of a 0.21 mol/liter aqueous solution of strontium nitrate and 143 cm$^3$ of a 0.14 mol/liter aqueous solution of diammonium hydrogen phosphate were simultaneously dropwise added slowly to cause the strontium phosphate to coprecipitate. The resultant slurry was adjusted to a pH of 9.0 by aqueous ammonia. Thereafter, the mixture was stirred at 30° C. for 17 hours, then the solid product was washed and dried. Next, it was calcined at 500° C. for 5 hours under an air flow to obtain a zeolite containing an apatite compound. Ten grams of this zeolite containing an apatite compound were added to 100 cm$^3$ of a 0.07 mol/liter aqueous solution of copper acetate, then the mixture was adjusted to a pH of 10.5 by aqueous ammonia and stirred at room temperature for 20 hours, then the solid product was washed, to subject to the Cu ion-exchange operation. This operation was repeated two times, then the resultant product was dried to prepare the Catalyst 7. As a result of an X ray diffraction measurement of the Catalyst 7, peaks representing an apatite structure other than zeolite were observed. Further, as a result of chemical analysis, it was found that the composition of Catalyst 7, expressed by the molar ratio of oxides in an anhydrous base, was as follows. The apatite content was 25% by weight.

1.29 CuO, 6.91 SrO, 2.36 $P_2O_5$, $Al_2O_3$, 41 $SiO_2$

The Catalysts 1–7 obtained in Examples 1–7 were used to evaluate the durability.

The catalysts were press molded, then pulverized and graded to a 12 to 20 mesh size. A 2 cm$^3$ amount of the resultant catalyst were packed into atmospheric fixed bed reaction tubes, then a gas (see Table 1) simulating the exhaust gas from a lean burn engine was passed at a space velocity of 120,000/hr and treated for durability at 800° C. for 5 hours. Thereafter, the pretreatment was performed at 550° C. for 30 minutes, then the steady purification activities at various temperatures were measured. The steady purification activity is defined as the $NO_x$ conversion after holding a sample for one hour at the respective temperatures. The results are shown in Table 2.

TABLE 1

| Gas Composition | |
|---|---|
| CO | 0.12 vol % |
| $C_3H_6$ | 0.08 vol % |
| NO | 0.12 vol % |
| $O_2$ | 4 vol % |
| $CO_2$ | 12 vol % |
| $H_2O$ | 10 vol % |
| $N_2$ | Balance |

TABLE 2

NO Conversion (%) at Various Temperature

| | After Endurance treatment | | |
|---|---|---|---|
| Catalyst | 300° C. | 400° C. | 500° C. |
| 1 | 1 | 19 | 24 |
| 2 | 0 | 20 | 20 |
| 3 | 1 | 21 | 22 |
| 4 | 0 | 14 | 22 |
| 5 | 0 | 18 | 22 |
| 6 | 0 | 18 | 20 |
| 7 | 0 | 19 | 22 |

Comparative Example 1

The same procedure was performed as in Example 1 to obtain a copper ion-exchanged ZSM-5 (Comparative Catalyst 1) except that no apatite compound was used. Further, as a result of chemical analysis, it was found that the composition, expressed by the molar ratio of oxides in an anhydrous base, was as follows.

1.03 CuO, $Al_2O_3$, 41 $SiO_2$

Comparative Example 2

The same procedure was performed as in Example 4 to obtain a cobalt ion-exchanged ZSM-5 (Comparative Catalyst 2) except that no apatite compound was used. Further, as a result of chemical analysis, it was found that the composition, expressed by the molar ratio of oxides in an anhydrous base, was as follows.

1.40 CoO, $Al_2O_3$, 41 $SiO_2$

Comparative Example 3

The same procedure was performed as in Example 1 to prepare a copper ion-exchanged ZSM-5 containing calcium pyrophosphate (Comparative Catalyst 3), except that, instead of the 0.09 mol/liter aqueous solution of ammonium dihydrogen phosphate, a 0.14 mol/liter aqueous solution of ammonium dihydrogen phosphate was used and that the pH of the aqueous solution of the ammonium dihydrogen phosphate was not adjusted. As a result of an X ray diffraction measurement of the Comparative Catalyst 3, peaks representing a calcium pyrophosphate structure other than zeolite were observed. Further, as a result of chemical analysis, it was found that the composition of Comparative Catalyst 3, expressed by the molar ratio of oxides in an anhydrous base, was as follows. The content of the calcium pyrophosphate was 6.2% by weight.

1.02 CuO, 1.46 CaO, 0.72 $P_2O_5$, $Al_2O_3$, 41 $SiO_2$

The Comparative Catalysts 1 to 3 obtained in Comparative Examples 1 to 3 were used to perform evaluations of the durability in the same manner as the method performed for the Catalysts 1 to 7. The results are shown in Table 3.

TABLE 3

NO conversion (%) at Various Temperature

| | After Endurance treatment | | |
|---|---|---|---|
| Catalyst | 300° C. | 400° C. | 500° C. |
| 1 | 1 | 5 | 16 |
| 2 | 1 | 7 | 17 |
| 3 | 0 | 12 | 18 |

Example 8

Ten grams of the Na-zeolite prepared by the same method as in Example 1 were added to 100 $cm^3$ of an aqueous solution of 8.3 g of $BaCl_2$. The resultant mixture was stirred at 60° C. for 20 hours, then the solid product was washed and dried, to subject to the barium ion-exchange operation. This operation was repeated two times, then the resultant product was dried to obtain a barium ion-exchanged zeolite.

Ten grams of the above-prepared barium ion-exchanged zeolite were added to 143 $cm^3$ of a 0.21 mol/liter aqueous solution of calcium acetate and the resultant mixture was stirred. Then, a solution containing 71 $cm^3$ of a 0.28 mol/liter aqueous solution of ammonium dihydrogen phosphate adjusted to a pH of 8.5 by aqueous ammonia was dropwise added to cause the calcium phosphate salts to coprecipitate. The resultant slurry was stirred at 60° C. for two hours, then the solid product was washed and dried. Thereafter, the resultant product was calcined at 500° C. for 5 hours under an air flow to obtain a zeolite containing an apatite compound therein.

Ten grams of the above-prepared barium ion-exchanged zeolite containing an apatite compound were added to 100 $cm^3$ of a 0.07 mol/liter aqueous solution of copper acetate. The mixture was adjusted to a pH of 10.5 by aqueous ammonia, then stirred at room temperature for 20 hours, then the solid product was washed, to subject to the Cu ion-exchange operation. This operation was repeated two times, then the result was dried to prepare the Catalyst 8. As a result of an X ray diffraction measurement of the Catalyst 8, peaks representing an apatite structure other than zeolite were observed. Further, as a result of chemical analysis, it was found that the composition of Catalyst 8, expressed by the molar ratio of oxides in an anhydrous base, was as follows. The content of the apatite was 17% by weight.

1.82 CuO, 5.96 CaO, 2.42 $P_2O_5$, 0.55 BaO, $Al_2O_3$, 41 $SiO_2$

Example 9

A 10 g amount of Na-zeolite immediately after synthesis, prepared in the same manner as in Example 1, was added to 100 $cm^3$ of an aqueous solution containing 2 g of $NH_4Cl$. The resultant slurry was stirred at 60° C. for 20 hours, then the solid product was washed and dried, to subject to by $NH_4$ ion-exchange operation and obtain an ammonium ion-exchanged zeolite.

An apatite compound was supported on 10 g of the above-prepared ammonium ion-exchanged zeolite in the same manner as in Example 1, then the resultant product was calcined to obtain an ammonium ion-exchanged zeolite containing apatite compound.

Ten grams of above prepared ammonium ion-exchanged zeolite containing the apatite compound were added to 200 $cm^3$ of an aqueous solution containing 9.2 g of $Ba(NO_3)_2$. The mixture was stirred at 60° C. for 20 hours, then the solid product was washed and dried to subject to a barium ion exchange operation. This operation was repeated two times, then the product was dried to prepare the barium ion-exchanged zeolite containing an apatite compound therein.

A 10 g amount of the above-prepared barium ion-exchanged zeolite containing an apatite compound was added to 100 $cm^3$ of a 0.07 mol/liter aqueous solution of copper acetate, followed by adjusting the pH to 10.5 by aqueous ammonia, then was stirred at room temperature for 20 hours. Thereafter, the solid product was washed, to subject to the Cu ion-exchange operation. This procedure was repeated two times, then the resultant product was dried to prepare the Catalyst 9. As a result of an X ray diffraction measurement of the Catalyst 9, peaks representing an apatite structure other than zeolite were observed. Further, as a result of chemical analysis, it was found that the composition of Catalyst 9, expressed by the molar ratio of oxides in an anhydrous base, was as follows. The apatite content was 15% by weight.

0.91 CuO, 4.90 CaO, 1.85 $P_2O_5$, 0.71 BaO, $Al_2O_3$, 41 $SiO_2$

Example 10

The same procedure was performed as in Example 9 to prepare the Catalyst 10, except that magnesium ion-exchange operation was performed, instead of the barium ion-exchange operation in Example 9. The magnesium ion-exchange was performed as follows.

That is, 10 g of ammonium ion-exchanged zeolite containing an apatite compound were added to 200 $cm^3$ of an aqueous solution of 9.1 g of $Mg(NO_3)_2$. The mixture was stirred at 60° C. for 20 hours, then the solid product was washed and dried. This operation was repeated two times to perform the magnesium ion-exchange operation. As a result of an X ray diffraction measurement of the Catalyst 10, peaks representing an apatite structure other than zeolite were observed. Further, as a result of chemical analysis, it was found that the composition of Catalyst 10 expressed by the molar ratio of oxides in an anhydrous base was as follows. The apatite content was 17% by weight.

1.40 CoO, 5.71 CaO, 2.10 $P_2O_5$, 0.25 MgO, $Al_2O_3$, 41 $SiO_2$

Example 11

A 143 $cm^3$ amount of a 0.21 mol/liter aqueous solution of calcium acetate was stirred. To this was added drop-wise an aqueous solution containing of a 71 $cm^3$ of a 0.28 mol/liter aqueous solution of ammonium dihydrogen phosphate adjusted to a pH of 8.5 by aqueous ammonia to cause coprecipitation of calcium phosphate. The resultant slurry was stirred at 60° C. for 2 hours, then the solid product was washed to obtain an apatite gel. The resultant apatite gel was added to 200 $cm^3$ of an aqueous solution containing 9.2 g of $Ba(NO_3)_2$. The resultant slurry was stirred at 60° C. for 20 hours, then the solid product was washed, to subject to the barium ion-exchange operation. This procedure was repeated two times to obtain a barium exchanged apatite gel.

Ten grams of ammonium ion-exchanged zeolite prepared in the same manner as in Example 9 were added to 41 $cm^3$ of a 0.10 mol/liter aqueous solution of copper acetate. The mixture was adjusted to a pH of 10.5 by aqueous ammonia, then was stirred at room temperature for 20 hours. Thereafter, the solid product was washed, to subject to copper ion exchange. This operation was repeated two times, then the product was dried to prepare the copper ion-exchanged zeolite.

The Ba ion-exchanged apatite gel and copper ion-exchanged zeolite obtained in the above manner were stirred in 100 $cm^3$ of an aqueous solution at room temperature for 0.5 hour, then the solid product was washed, dried, then calcined at 500° C. for 5 hours under an air flow to prepare the Catalyst 11. As a result of an X ray diffraction measurement of the Catalyst 11, peaks representing an apatite structure other than zeolite were observed. Further, as a result of chemical analysis, it was found that the composition of Catalyst 12, expressed by the molar ratio of oxides in an anhydrous base was as follows. The apatite content was 18% by weight.

1.02 CuO, 6.11 CaO, 2.39 $P_2O_5$, 0.51 BaO, $Al_2O_3$, 41 $SiO_2$

Example 12

The same procedure was performed as in Example 9 to prepare the Catalyst 12, except that cobalt exchange was performed, instead of the copper exchanged, in Example 9. The cobalt ion-exchange operation was performed as follows.

Namely, 10 g amount of barium ion-exchanged zeolite containing an apatite compound were added to 90 $cm^3$ of a 0.22 mol/liter aqueous solution of Co (II) acetate. The mixture was stirred at 60° C. for 20 hours, then the solid product was washed for cobalt ion exchange. This operation was repeated two times, then the resultant product was dried to prepare the Catalyst 12. As a result of an X ray diffraction measurement of the Catalyst 13, peaks representing an apatite structure other than zeolite were observed. Further, as a result of chemical analysis, it was found that the composition of Catalyst 12, expressed by the molar ratio of oxides in an anhydrous base was as follows. The apatite content was 25% by weight.

1.42 CoO, 7.15 CaO, 2.38 $P_2O_5$, 0.70 BaO, $Al_2O_3$, 41 $SiO_2$

The Catalysts 8 to 12 obtained in Examples 8 to 12 were used to perform evaluations of the durability in the same way as the method performed for the Catalysts 1 to 7. The results are shown in Table 4.

TABLE 4

| | NO Conversion (%) at various Temperature | | |
| --- | --- | --- | --- |
| | After Endurance treatment | | |
| Catalyst | 300° C. | 400° C. | 500° C. |
| 8 | 1 | 22 | 26 |
| 9 | 1 | 22 | 26 |
| 10 | 1 | 22 | 25 |
| 11 | 1 | 22 | 25 |
| 12 | 1 | 15 | 24 |

Example 13

A 143 $cm^3$ amount of a 0.21 mol/liter aqueous solution of calcium acetate and a 50 $cm^3$ amount of a 0.29 mol/liter aqueous solution of magnesium acetate were mixed and 10 g of the ammonium ion-exchanged zeolite prepared by the same method as in Example 1 were added to the resultant mixture, followed by stirring. Then, a solution of 71 cm$^3$ of a 0.29 mol/liter aqueous solution of ammonium dihydrogen phosphate adjusted to a pH of 8.5 by aqueous ammonia was dropwise added to cause the magnesium calcium phosphate to coprecipitate. The resultant slurry was stirred at 60° C. for two hours, then the solid product was washed and dried. Next, this was calcined at 500° C. for 5 hours under an air flow to obtain a zeolite containing an apatite compound composed of two kinds of M.

Ten grams of zeolite containing an apatite compound composed of two kinds of M were added to 100 cm$^3$ of a 0.07 mol/liter aqueous solution of copper acetate. The mixture was adjusted to a pH of 10.5 by aqueous ammonia, then was stirred at room temperature for 20 hours, then the solid product was washed, to subject to copper ion exchange. This operation was repeated two times, then the product was dried to prepare the Catalyst 13. As a result of an X ray diffraction measurement of the Catalyst 13, peaks representing an apatite structure other than zeolite were observed. Further, as a result of chemical analysis, it was found that the composition of Catalyst 13, expressed by the molar ratio of oxides in an anhydrous base, was as follows.

1.39 CuO, 6.29 CaO, 0.06 MgO, 2.20 $P_2O_5$, $Al_2O_3$, 41 $SiO_2$

The content of the apatite composed of two kinds of M was 18% by weight.

Example 14

The same procedure was performed as in Example 13 to prepare the Catalyst 14, except that, instead of the 0.028 mol/liter aqueous solution of magnesium acetate, a 0.028 mol/liter aqueous solution of manganese acetate was used. As a result of an X ray diffraction measurement of the Catalyst 14, peaks representing an apatite structure other than zeolite were observed. Further, as a result of chemical analysis, it was found that the composition of Catalyst 14, expressed by the molar ratio of oxides in an anhydrous base, was as follows.

1.69 CuO, 6.19 CaO, 0.36 MgO, 2.31 $P_2O_5$, $Al_2O_3$, 41 $SiO_2$

The content of the apatite composed of two kinds of M was 18% by weight.

Example 15

The same procedure was performed as in Example 13 to prepare the Catalyst 15, except that, instead of the 0.028 mol/liter aqueous solution of magnesium acetate, a 0.028 mol/liter aqueous solution of zinc acetate was used. As a result of an X ray diffraction measurement of the Catalyst 15, peaks representing an apatite structure other than zeolite were observed. Further, as a result of chemical analysis, it was found that the composition of Catalyst 15, expressed by the molar ratio of oxides in an anhydrous base, was as follows.

1.34 CuO, 6.11 CaO, 0.36 ZnO, 2.41 $P_2O_5$, $Al_2O_3$, 41 $SiO_2$

The content of the apatite composed of two kinds of M was 18% by weight.

Example 16

The same procedure was performed as in Example 13 to prepare the Catalyst 16, except that, instead of the 0.028 mol/liter aqueous solution of magnesium acetate, a 0.028 mol/liter aqueous solution of cerium acetate was used. As a result of an X ray diffraction measurement of the Catalyst 16, peaks representing an apatite structure other than zeolite were observed. Further, as a result of chemical analysis, it was found that the composition of Catalyst 16, expressed by the molar ratio of oxides in an anhydrous base, was as follows.

1.46 CuO, 6.33 CaO, 0.17 $Ce_2O_3$, 2.46 $P_2O_5$, $Al_2O_3$, 41 $SiO_2$

The content of the apatite composed of two kinds of M was 18% by weight.

Example 17

The same procedure was performed as in Example 13 to prepare the Catalyst 17, except that, instead of the 0.028 mol/liter aqueous solution of magnesium acetate, a 0.12 mol/liter aqueous solution of cerium acetate was used and, instead of the 0.29 mol/liter aqueous solution of ammonium dihydrogen phosphate, a 0.34 mol/liter aqueous solution of ammonium dihydrogen phosphate was used. As a result of an X ray diffraction measurement of the Catalyst 17, peaks representing an apatite structure other than zeolite were observed. Further, as a result of chemical analysis, it was found that the composition of Catalyst 17, expressed by the molar ratio of oxides in an anhydrous base was as follows.

1.42 CuO, 5.35 CaO, 0.65 $Ce_2O_3$, 2.79 $P_2O_5$, $Al_2O_3$, 41 $SiO_2$

The content of the apatite composed of two kinds of M was 18% by weight.

Example 18

The same procedure was performed as in Example 13 to prepare the Catalyst 18, except that, instead of the copper ion exchange, cobalt ion exchange was performed as follows.

Ten grams of zeolite containing an apatite compound composed of two kinds of M were added to 90 cm$^3$ of a 0.22 mol/liter aqueous solution of Co (II) acetate. The mixture was stirred at 60° C. for 20 hours, then the solid product was washed for cobalt ion exchange. This operation was repeated two times, then the sample was dried to prepare the Catalyst 18. As a result of an X ray diffraction measurement of the Catalyst 18, peaks representing an apatite structure other than zeolite were observed. Further, as a result of chemical analysis, it was found that the composition of Catalyst 18, expressed by the molar ratio of oxides in an anhydrous base, was as follows.

1.10 CoO, 6.30 CaO, 0.07 MgO, 2.22 $P_2O_5$, $Al_2O_3$, 41 $SiO_2$

The content of the apatite composed of two kinds of M was 18% by weight.

The evaluation was made of the durability using the Catalysts 13 to 18 obtained in Examples 13 to 18.

The catalysts were press molded, then pulverized and graded to a 12 to 20 mesh size. Two cm$^3$ amounts were packed into atmospheric fixed bed reaction tubes, then a gas (Table 1) simulating the exhaust gas of a lean burn engine was passed at a space velocity of 120,000/hr and treated for durability at 700° C. for 5 hours. After this, pretreatment was performed at 550° C. for 30 minutes, then the steady purification activities at various temperatures were measured. The steady purification activity is defined as the NOx conversion after holding a sample at one hour at the respective temperatures.

TABLE 5

| | NO Conversion (%) at various Temperature | | |
| --- | --- | --- | --- |
| | After Endurance treatment | | |
| Catalyst | 350° C. | 400° C. | 550° C. |
| 13 | 13 | 31 | 29 |
| 14 | 17 | 31 | 29 |
| 15 | 10 | 29 | 30 |
| 16 | 13 | 32 | 29 |
| 17 | 17 | 31 | 28 |
| 18 | 11 | 28 | 29 |

Using Comparative Catalysts 1 to 2 obtained in Comparative Examples 1 to 2, an evaluation was made of the catalytic durability in the same way as in the method used for Catalysts 13 to 18. The results obtained are shown in Table 6.

TABLE 6

| | NO Conversion (%) at various Temperature | | |
| --- | --- | --- | --- |
| | After Endurance treatment | | |
| Catalyst | 350° C. | 400° C. | 450° C. |
| 1 | 6 | 18 | 26 |
| 2 | 4 | 16 | 18 |

As clear from Tables 2 to 6, according to the method of the present invention, it is possible to efficiently remove nitrogen oxides even after the catalyst is used at a high temperature.

We claim:

1. A method for catalytically reducing nitrogen oxides from an oxygen-rich exhaust gas containing nitrogen oxides and hydrocarbons, comprising
   a) bringing the oxygen-rich exhaust gas into contact with a catalyst comprising
      (i) a zeolite containing an apatite compound and having an $SiO_2/Al_2O_3$ molar ratio of at least 15, and
      (ii) at least one active metal,
   at a space velocity between 100 to 500,000 $hr^{-1}$ and a temperature between 200° to 800° C., under conditions such that said exhaust gas contacts an amount of said catalyst effective for reducing said nitrogen oxides by at least 14%,
   wherein the content of the apatite compound in the catalyst is 1 to 80% by weight, and
   wherein the reduction is substantially carried out by said hydrocarbons as reductants.

2. A method as claimed in claim 1, wherein the $SiO_2/Al_2O_3$ molar ratio is 15 to 200.

3. A method as claimed in claim 1, wherein the active metal is at least one metal selected from the group consisting of Group Ib, Group VIII, Group VIb, and Group VIIb of the Periodic Table.

4. A method as claimed in claim 1, wherein the active metal is copper.

5. A method as claimed in claim 1, wherein the active metal is cobalt.

6. A method as claimed in claim 1, wherein the atomic ratio of the active metal is 0.5 to 20 to the aluminum atom contained in the zeolite.

7. A method for catalytically reducing nitrogen oxides from an oxygen-rich exhaust gas containing nitrogen oxides and hydrocarbons, comprising
   a) bringing the oxygen-rich exhaust gas into contact with a catalyst comprising
      (i) a zeolite containing an apatite compound and having an $SiO_2/Al_2O_3$ molar ratio of at least 15,
      (ii) an alkaline earth metal, and
      (iii) at least one active metal,
   at a space velocity between 100 to 500,000 $hr^{-1}$ and a temperature between 200° to 800° C., under conditions such that said exhaust gas contacts an amount of said catalyst effective for reducing said nitrogen oxides by at least 14% at 400° C.,
   wherein the content of the apatite compound in the catalyst is 1 to 80% by weight, and
   wherein the reduction is substantially carried out by said hydrocarbons as reductants.

8. A method as claimed in claim 7, wherein the $SiO_2/Al_2O_3$ molar ratio is 15 to 200.

9. A method as claimed in claim 7, wherein the active metal is at least one metal selected from the group consisting of Group Ib, Group VIII, Group VIb, and Group VIIb of the Periodic Table.

10. A method as claimed in claim 7, wherein the active metal is copper.

11. A method as claimed in claim 7, wherein the active metal is cobalt.

12. A method as claimed in claim 7, wherein the atomic ratio of the active metal is 0.5 to 20 to the aluminum atoms contained in the zeolite.

13. A method as claimed in claim 7, wherein the atomic ratio of the alkaline earth metal is 0.5 to 20 to the aluminum atoms contained in the zeolite.

14. A method as claimed in claim 7, wherein the alkaline earth metal is magnesium.

15. A method as claimed in claim 7, wherein the alkaline earth metal is barium.

* * * * *